United States Patent [19]

Hudak

[11] 4,397,873

[45] Aug. 9, 1983

[54] DARK-COLORED FREEZE DRIED COFFEE

[75] Inventor: Stephen F. Hudak, Croton-on-Hudson, N.Y.

[73] Assignee: General Foods Corporation, White Plains, N.Y.

[21] Appl. No.: 353,280

[22] Filed: Mar. 1, 1982

[51] Int. Cl.³ ............................................... A23F 5/32
[52] U.S. Cl. ..................................... 426/385; 426/594
[58] Field of Search ......................................... 426/385

[56] References Cited

U.S. PATENT DOCUMENTS

| | | | |
|---|---|---|---|
| 3,244,529 | 4/1966 | Johnson et al. | 426/385 |
| 3,253,420 | 5/1966 | DeGeorge | 426/524 X |
| 3,373,042 | 3/1968 | Elerath et al. | 426/385 |
| 3,399,061 | 8/1968 | Lutz | 426/385 |
| 3,443,963 | 5/1969 | Simon et al. | 426/385 |
| 3,682,650 | 8/1972 | Easton et al. | 426/385 X |
| 3,966,979 | 6/1976 | Katz et al. | 426/385 |

OTHER PUBLICATIONS

Goldblith et al., Freeze Drying and Advanced Food Technology, 1975, Academic Press, New York, pp. 145–148, 483–486.

*Primary Examiner*—Joseph M. Golian
*Attorney, Agent, or Firm*—Thomas V. Sullivan; Richard L. Crisona; Daniel J. Donovan

[57] ABSTRACT

A dark-colored freeze dried coffee is produced by using a multi-step process to freeze the coffee extract. The coffee extract is chilled to a temperature at which an ice slush forms. The slushed extract is heated in order to melt some of the slush and subsequently re-chilled. This procedure may be repeated one or more times prior to chilling the extract below its eutectic point and freeze drying the frozen extract.

4 Claims, No Drawings

DARK-COLORED FREEZE DRIED COFFEE

DESCRIPTION

TECHNICAL FIELD

The present invention relates to a process for producing a dark-colored freeze dried coffee. Specifically, this invention involves a multi-step freezing process wherein coffee extract is chilled to a temperature at which slush forms. The slushed extract is subsequently heated whereby some of the slush is melted. Next, the coffee extract is chilled to a temperature below its eutectic point and the frozen extract is freeze dried.

BACKGROUND ART

It is recognized in the art that rapid freezing of a water-bearing substance will promote the distribution of a great number of small ice crystals and slow freezing provides a lesser number of larger ice crystals. As applied to freeze dried coffee, it is known that a rapidly frozen coffee extract containing the smaller ice crystals yields a light-colored, tan soluble coffee whereas a slowly frozen extract containing larger ice crystals provides a darker coffee which more nearly resembles the appearance of roast and ground coffee.

The art establishes several methods of freezing coffee extract slowly enough to provide a darker-colored freeze dried coffee product. A method of freezing coffee extract on a chilled metal belt is disclosed in U.S. Pat. No. 3,253,420 to De George wherein freezing takes place over an approximately 15 minute period. A method of freezing whereby coffee extract is agitated while being chilled from its ice point to a temperature below its eutectic point over a period of between 15 minutes and 30 minutes is disclosed in U.S. Pat. No. 3,399,061 to Lutz. While these disclosures provide for a dark-colored freeze dried coffee, they are of necessity slow and hence limiting on productivity. A process aimed at improving productivity, described in U.S. Pat. No. 3,373,042 to Elerath et al., involves first slushing the coffee extract prior to the rapid freezing of said extract. The process makes no provision for promoting ice crystal growth by subsequently melting some slush and so does not serve to darken color.

More rapid methods of freezing coffees extracts which do darken finished product color are known but they are not without certain drawbacks. For instance, U.S. Pat. No. 3,443,963 to Simon et al. describes a process wherein coffee extract is first chilled to about −5° C. and held at that temperature for nearly 20 minutes prior to rapid freezing. Though maintenance of the extract at −5° C. will promote some crystal growth, the process does not provide for a melting step wherein the smaller ice crystals are destroyed.

Another disclosure, U.S. Pat. No. 3,966,979 to Katz et al., describes a multi-layered freezing process wherein the upper portion of a fast frozen extract layer is melted by having a layer of warm coffee extract placed on top and both layers are then frozen prior to the addition of the next layer. The melting and freezing of the upper portion of a layer promotes larger ice crystals therein but the lower portion of the fast frozen layer is unaffected which lower portion presumably contains the smaller ice crystals developed by rapid freezing.

It is an object of the present invention to provide a process for producing a dark-colored freeze dried coffee. It is a further object of this invention to provide a multi-step freezing process that is not limiting on productivity.

DISCLOSURE OF THE INVENTION

A process for producing a dark-colored freeze dried coffee has now been found wherein a multi-step process for freezing the coffee extract is used. The aqueous coffee extract is initially chilled to a point at which an ice slush forms. The slushed extract is then heated in order to melt some of the slush and subsequently re-chilled. This cycle of heating and re-chilling may be repeated one or more times prior to chilling the extract to a temperature below its eutectic point and freeze drying the frozen extract.

The initial freezing step involves chilling the coffee extract to a temperature between −2° C. and −5° C. whereby an ice slush forms. The temperature at which the slush forms is dependent on the concentration of the coffee extract, with a lower chilling temperature required for a higher concentration extract. While the rate of the initial chilling is not important in determining the color of the final freeze dried coffee product, it is preferred to chill rapidly in order to maximize productivity. It has been found that a scraped surface heat exchanger maintained at approximately −10° C. is particularly suitable for chilling the coffee extract to the point at which an ice slush forms. For instance, the coffee extract is conveniently passed through the scraped surface heat exchanger and emerges as an ice slush which slush is forwarded to a vessel for the next step of the multi-step freezing process.

After the ice slush is produced, the slushed coffee extract is heated to slightly less than 0° C. whereby some of the slush is melted. The manner of heating is not critical in determining the color of the finished product. The heating of the slushed extract may be carried out very rapidly by, for example, exposing the extract to microwave radiation for a length of time sufficient to melt a quantity of the slush and raise the extract temperature to slightly less than 0° C. Alternatively, the temperature of the slushed extract may be raised more slowly by simply raising the temperature of the vessel in which the coffee extract is being held. The important factor in heating the coffee extract is raising the temperature to slightly less than 0° C. in order to melt a portion of the slush.

It may be desirable to repeat both the chilling and heating steps prior to chilling the coffee extract to a temperature below its eutectic point. As hereinbefore noted, rapid freezing promotes the growth of a great number of small ice crystals whereas slow freezing promotes the growth of a fewer number of larger crystals. It is theorized that the heating step of the present invention destroys the smaller ice crystals thereby permitting the remaining crystals to grow larger upon re-chilling. Repetition of the chilling and heating steps provides for the destruction of essentially all of the smaller ice crystals yet permits the growth of relatively larger ice crystals. As previously mentioned, the larger ice crystals are responsible for the darker-colored freeze dried coffee product. For this embodiment, the coffee extract which has been once chilled and heated is again chilled to a temperature of approximately −2° C. whereby ice slush is formed. The slushed extract is subsequently heated to slightly less than 0° C. as hereinabove described. The chilling and heating cycle may be repeated as many times as necessary to achieve the desired color. A point is reached however where the incremental darkened color achieved does not justify the additional processing.

When the coffee extract has been chilled to an ice slush and subsequently heated the desired number of times, the extract is chilled to a temperature below its eutectic point. "Eutectic point" means that temperature at which a specific mixture of coffee solids, volatile aromatics and water having the lowest melting point of any other mixture in the extract, solidifies. In other words, chilling the extract to below its eutectic point puts the extract in a frozen state suitable for further processing in the freeze drying process. Chilling may be in any manner capable of sufficiently lowering the extract temperature and may be carried out very rapidly. Placing the coffee extract as a slab on a continuous, chilled moving metal belt is particularly suited to meeting the object of the present invention. This method of chilling the coffee extract is set forth more fully in U.S. Pat. No. 3,253,420 to De George.

The primary advantage of the present invention is in permitting the rapid chilling of the extract to a temperature below its eutectic point. Installation and operation of equipment capable of such chilling, such as the metal belt described above, is very expensive, creating a great need to maximize productivity of the equipment. Prior art techniques hereinbefore described require chilling the extract to a temperature below its eutectic point at the relatively slow rate of approximately 15 minutes or more. The present invention provides for the chilling of the extract to an ice slush and subsequent heating in equipment separate from that used to chill to a temperature below the eutectic point. By providing for separate equipment for the different freezing steps, as well as permitting rapid chilling of the slushed extract to a temperature below its eutectic point, this invention maximizes the productivity of the most equipment intensive and costly step of freezing a coffee extract.

Once the extract has been frozen, it may be freeze dried in a manner well known in the art wherein water is vaporized from the frozen extract without passing through the liquid phase. Coffee extract which has been frozen by the process described herein and subsequently freeze dried will provide a dark-colored freeze dried coffee with an appearance more nearly resembling that of roast and ground coffee.

The following example more fully illustrates the present invention.

EXAMPLE

1. Aqueous coffee extract containing 24% by weight coffee solids was placed in a stirred vessel which vessel was maintained at −10° C. A sample of liquid coffee extract was taken at a temperature of 0° C. The coffee extract was held in the stirred vessel until an ice slush formed at a temperature of about −2° C. The stirring was for the purpose of promoting good heat transfer.

2. The temperature of the vessel was then raised to approximately 0° C. until some of the ice slush melted and re-chilled to a temperature of about −2° C.

3. The temperature of the vessel was subsequently lowered to −10° C. and raised to 0° C. two more times over the course of 1 hour.

4. A sample of slush from each step was placed in a pan maintained at approximately −25° C. The slush was frozen solid within between 5 and 10 minutes. A sample of coffee extract which was not subjected to steps 1 through 3 was placed in a separate pan and similarly frozen solid as a control.

5. The frozen extract samples from step 4 were freeze dried for 18 hours at a pressure of 200 microns and a temperature of 40° C. in a laboratory freeze dryer.

6. The color of the two freeze dried coffee samples was measured. The color was measured by comparing the amount of light reflected by a given sample in comparison to the amount of light reflected by a standard according to a procedure well known in the art.

The color of the control sample was 31 color units whereas the color of the sample that was frozen by the process of the present invention was 24 color units. The results are summarized in the table below.

TABLE I

| STEP | TIME | VESSEL TEMP. | SLUSH TEMP. | COLOR (After Freezing and Drying) |
| --- | --- | --- | --- | --- |
| Initial Chill to 0° C. | — | −10° C. | — | 31.0 |
| Chill to slush | 30 min. | −10° C. | −2° C. | 29.5 |
| Warm | 10 min. | 0° C. | — | — |
| Re-chill to slush | 15 min. | −10° C. | −2° C. | 28.0 |
| Warm | 10 min. | 0° C. | — | — |
| Re-chill to slush | 15 min. | −10° C. | −2° C. | 26.5 |
| Warm | 10 min. | 0° C. | — | — |
| Re-chill to slush | 15 min. | −10° C. | −2° C. | 24.0 |

I claim:
1. A process for producing a dark-colored freeze dried coffee which comprises:
 (a) rapidly chilling an aqueous coffee extract to a temperature between −2° C. and −5° C. whereby a slush forms;
 (b) heating said slushed extract to a temperature slightly below 0° C. whereby some of the slush begins to melt;
 (c) re-chilling the heated extract of step (b) to a temperature from −2° C. to −5° C. and repeating the heating and re-chilling steps one or more times;
 (d) further rapidly chilling said extract to a temperature below its eutectic point whereby the coffee extract is frozen solid; and
 (e) freeze drying the frozen extract.
2. The process of claim 1 which further comprises stirring the coffee extract while re-chilling it to a temperature from −2° C. to −5° C.
3. The process of claim 1 wherein the rapid chilling of step (a) of claim 1 is carried out in a scraped surface heat exchanger maintained at approximately −10° C.
4. The process of claim 1 wherein the chilling of the extract below its eutectic point of step (c) of claim 1 is carried out on a continuous, chilled moving metal belt.

* * * * *